United States Patent [19]
Selci

[11] Patent Number: 6,144,123
[45] Date of Patent: Nov. 7, 2000

[54] ELECTRIC CHUCK

[75] Inventor: Giancarlo Selci, Pesaro, Italy

[73] Assignee: H.S.D. S.r.l., Italy

[21] Appl. No.: 09/361,852

[22] Filed: Jul. 27, 1999

[30] Foreign Application Priority Data

Jul. 29, 1998 [IT] Italy ................................ BO98A0465

[51] Int. Cl.⁷ .................................................... H02K 9/00
[52] U.S. Cl. .................. 310/52; 279/4.04; 165/DIG. 139
[58] Field of Search ................................. 310/52, 47, 50;
279/4.04; 165/80.3, 86, DIG. 139

[56] References Cited

U.S. PATENT DOCUMENTS

| | | | |
|---|---|---|---|
| 3,818,778 | 6/1974 | Seely et al. | 74/421 A |
| 3,824,684 | 7/1974 | Wheeler | 29/596 |
| 3,844,341 | 10/1974 | Bimshas, Jr. et al. | 165/86 |
| 4,715,732 | 12/1987 | Sanders | 384/320 |
| 4,855,558 | 8/1989 | Ramsbro | 219/69.15 |
| 5,594,623 | 1/1997 | Schwegler | 361/697 |
| 5,909,882 | 6/1999 | Schill | 279/4.04 |

FOREIGN PATENT DOCUMENTS

| | | |
|---|---|---|
| 0415138 | 8/1990 | European Pat. Off. . |
| 9615382 | 10/1997 | Germany . |
| 5577351 | 6/1980 | Japan . |
| 7185994 | 7/1995 | Japan . |
| 8300339 | 11/1996 | Japan . |
| 9261924 | 10/1997 | Japan . |

OTHER PUBLICATIONS

Patent abstract of Japan, pub. No. 07185994, Nov. 30, 1995.
Patent abstract of Japan, pub. No. 08300239, Nov. 19, 1996.
Patent abstract of Japan, pub. No. 09261924, Oct. 3, 1993.
Patent abstract of Japan, pub. No. 55–077351, Jun. 11, 1980.

*Primary Examiner*—Nestor Ramirez
*Assistant Examiner*—Joseph Waks
*Attorney, Agent, or Firm*—Liniak, Berenato, Longacre & White

[57] ABSTRACT

An electric chuck constituted by an electric motor coupled to a chuck in which the rotating tool is engaged; the electric motor being provided with a cooling device for the rotor located within the interior of the casing of the electric motor; the cooling device being constituted by an annular heat sink fitted to the shaft of the rotor in contact with the armature of the rotor, and a calibrated nozzle for directing a jet of air over the annular heat sink; the chuck being provided with a release device for the rotating tool operated pneumatically and controlled by a source of air under pressure, and the said calibrated nozzle being connected to this source of air under pressure.

20 Claims, 1 Drawing Sheet

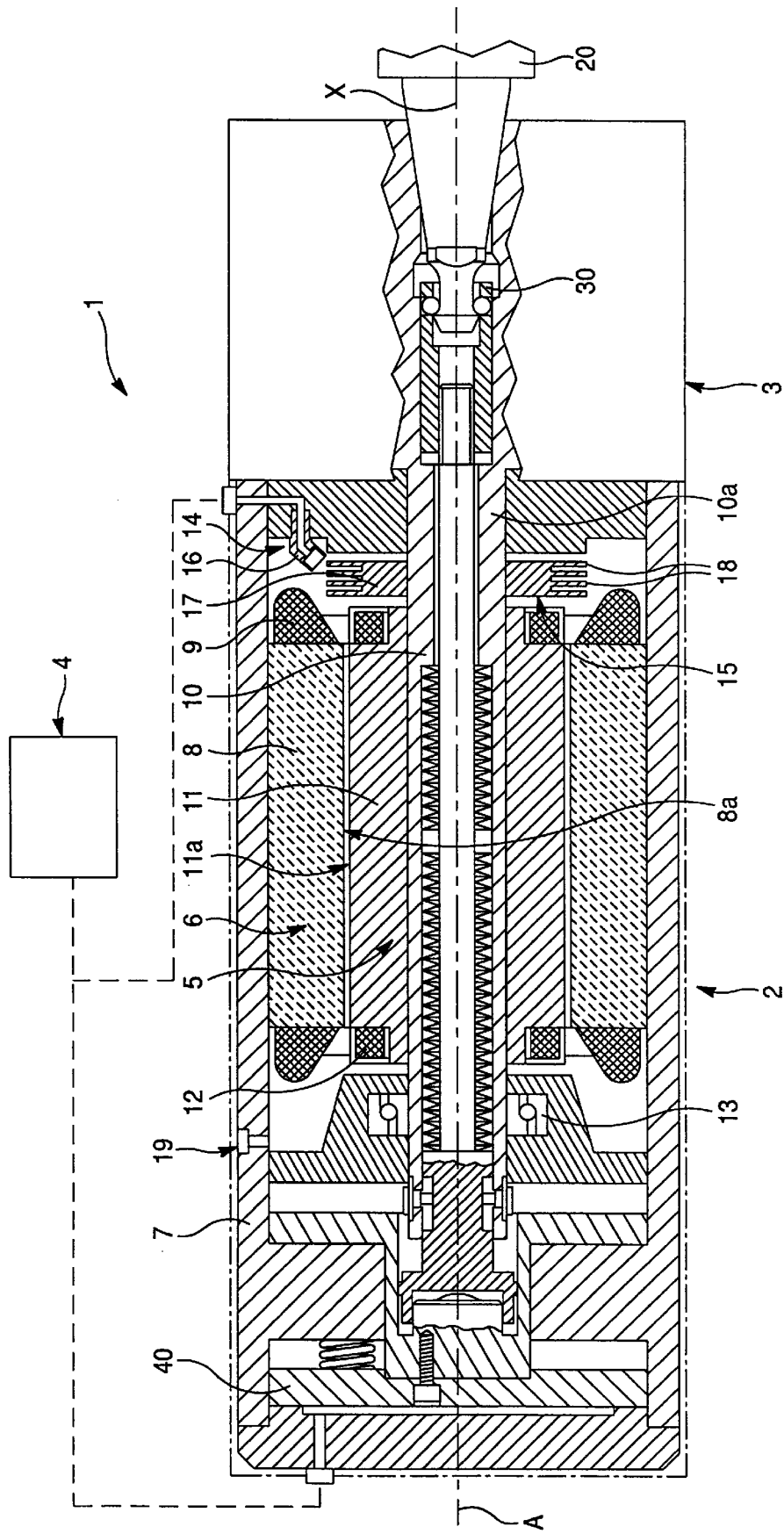

ELECTRIC CHUCK

The present invention relates to an electric chuck.

BACKGROUND OF THE INVENTION

As is known, currently available electric chucks for machine tools are constituted by an electric motor, generally of asynchronous type, coupled to a chuck capable of holding the rotating tool to be driven. Generally, the chuck is provided with a device for gripping and releasing the tool in such a way as to be able to exchange one rotating tool for another rapidly.

The electric rotor of the electric chuck normally comprises a stator of tubular form extending coaxially of the longitudinal axis of the motor; a rotor of substantially cylindrical form mounted rotatably within this stator to turn about the longitudinal axis of the motor; and a protective casing containing the stator and the rotor. In particular, the stator is fixed to the interior of the casing whilst the rotor is maintained within the stator, coaxial with the longitudinal axis of the motor, by means of rolling element bearings interposed between the rotor and the casing.

The electric motor is, moreover, provided with a cooling fan for producing a stream of air, which by flowing over the outer surface of the casing of the motor carries away the heat produced by the rotor and the stator during normal operation.

However, the cooling of the electric motor achieved by this cooling fan is not particularly efficient and thus constrains the producers of electric chucks to limit the performance of their products. Neglecting the mechanical losses the power which can be delivered by an electric chuck is in fact equal to the power available from the electric motor which is, in turn, limited by the quantity of heat which can be dissipated per unit of time through the casing of the electric motor without exceeding the operating temperature limit.

In particular, the parameter which strongly influences the power which can be delivered by the electric motor of the electric chuck is the maximum quantity of heat which can be dissipated per unit of time from the rotor, this latter being in fact the element of the electric motor which has the greatest difficulty in dissipating the heat produced.

SUMMARY OF THE INVENTION

The object of the present invention is that providing an electric chuck with a cooling system for the electric motor which permits a better cooling of the rotor, therefore permitting the electric motor to deliver a greater power for the same dimensions.

According to the present invention there is provided an electric chuck comprising an electric motor provided with a stator, a rotor mounted rotatably within the stator about a first axis of rotation, and an outer casing housing the stator and the rotor within its interior; the electric chuck being characterised in that the said electric motor includes rotor cooling means housed within the said casing.

BRIEF DESCRIPTION OF THE DRAWING

The present invention will now be described with reference to the attached drawing which illustrates a non-limitative embodiment thereof in section and with parts removed for clarity.

DETAILED DESCRIPTION OF THE INVENTION

With reference to the attached drawings, the reference numeral 1 generally indicates an electric chuck for machine tools comprising an electric motor 2 and a chuck 3 mechanically coupled together.

The chuck 3, of known type, is able to receive any type of rotating tool 20 coaxial with a given axis X, and is provided with a mechanical locking device 30 for securing the rotating tool for rotation with the output shaft of the electric motor 2, and a pneumatically operated release device 40 which can be controlled to oppose the action of the mechanical locking device to release the rotating tool, upon command, from the output shaft of the electric motor 2. This release device 40 is controlled by a source 4 of air under pressure of known type.

With reference to the attached drawings, the electric motor 2, which is of asynchronous type in the example illustrated, comprises a rotor 5 of substantially cylindrical form extending coaxially of a longitudinal axis A which, in the example illustrated, coincides with the axis X; a stator 6 of tubular form extends coaxially of the axis A externally of the rotor 5; and a casing 7 housing the rotor 5 and the stator 6. The casing 7, in particular, carries the stator 6 fixed within it, whilst the rotor 5 is mounted to rotate about the axis A within the stator 6.

In the illustrated example the stator 6 comprises a cylindrical tubular body 8 of ferromagnetic material, commonly called "stator armature", which extends within the casing 7 coaxially of the axis A, and a plurality of windings 9 of electrically conductive material housed within a plurality of longitudinal slots (not illustrated) formed on the inner lateral surface 8a of the cylindrical tubular body 8. These windings 9, when an alternating electric current flows through them, generate a rotating magnetic field which invests the rotor 5 carrying it into rotation.

In the illustrated example the rotor 5 comprises a shaft 10 extending within the casing 7 coaxially of the axis A in such a way that at least an end portion 10a projects out from the casing 7; a cylindrical tubular body 11 of ferromagnetic material, commonly called "rotor armature", fixed to the shaft 10 in such a way that its outer lateral surface 11a faces the inner lateral surface 8a of the stator 6; and a squirrel cage winding 12 housed within a plurality of longitudinal slots (not illustrated) formed on the outer lateral surface 11a of the tubular cylindrical body 11.

The shaft 10 is mounted for rotation about the axis A within the casing 7 by means of rolling element bearings 13 of known type and defines the output shaft of the electric motor 2. The mechanical chuck locking device 3 is therefore connected to the end portion 10a of the shaft 10 in such a way that the electric motor 2 can carry the said rotating tool into rotation about the axis X, or rather the axis A, when the alternating electric current flows in the windings 9 of the stator 6.

With reference to the attached figure, the electric motor 2 finally includes a cooling device 14 for dissipating heat produced by the rotor 5 and the stator 6 during operation. This cooling device 14 is disposed within the casing 7 and comprises an annular heat sink 15 fitted to the shaft 10 in such a way as to be in contact with one end of the tubular cylindrical body 11, and a blower outlet 16 acting to direct a stream of air onto the annular heat sink 15 to dissipate the excess heat.

The annular heat sink 15, in particular, is constituted by a hub 16 fitted on the shaft 10 and by a plurality of fins 18 coaxial with the axis A which extend from the surface of the hub 17 parallel to and facing one another, whilst the blower outlet 16 is constituted by a calibrated nozzle extending from the casing 7 above the annular fins 18 in such a way that the air stream from it flows over the entire height of the annular fins 18.

Preferably, but not necessarily, the calibrated nozzle 16 is connected to the source of air under pressure 4 in such a way as to utilise, for cooling the rotor 5 and the stator 6 the same air under pressure as is normally utilised to control the release device of the chuck 3. Obviously, the casing 7 is provided with one or more pressure relief openings 19 through which the air can escape after having passed over the annular fins 18 thereby cooling them.

The operation of the electric chuck 1 is easily deducible from what has been described above, and further explanations are therefore not necessary.

It is obvious, that for the same external dimensions, the electric chuck 1 described and illustrated here is able to develop a greater power in that it is able more efficiently to dissipate heat produced by the rotor of the electric motor 2.

Finally, it is clear that the electric chuck 1 described and illustrated here can have variations and modifications introduced thereto without by this departing from the ambit of the present invention.

What is claimed is:

1. An electric chuck (1) comprises an electric motor (2) provided with a stator (6), a rotor (5) mounted rotatably within the stator (6) about a first axis of rotation (A), and an outer casing (7) housing within its interior said stator (6) and said rotor (5); and cooling means (14) housed within the interior of said casing (7) for cooling the rotor (5); wherein said cooling means comprises at least one annular heat sink fitted to said rotor, and one blower outlet projecting from said casing directly above said heat sink in order to dissipate heat produced.

2. An electric chuck according to claim 1, wherein said rotor (5) comprises a shaft (10) extended coaxially of said first axis of rotation (A) and mounted for rotation about said first axis of rotation (A), and a rotor armature (11) fitted to said shaft (10) in such a way as to face said stator (6); said annular heat sink (15) being fitted to said shaft (10) in such a way so as to be in contact with said rotor armature (11).

3. An electric chuck according to claim 2, wherein said annular heat sink (15) comprises a hub (17) fitted to the shaft (10) and at least one annular fin (18) extending from a peripheral surface of the hub (17); said annular fin (18) being coaxial with said first axis of rotation (A).

4. An electric chuck according to claim 3, wherein said annular heat sink (15) includes a plurality of said annular fins (18) extending from the peripheral surface of the hub (17) parallel to and facing one another.

5. An electric chuck according to claim 4, further comprising a chuck (3) for receiving a rotating tool; said chuck (3) having a mechanical locking device for fixing said rotating tool securely with respect of the shaft (10) of said electric motor (2) in such a way that the electric motor (2) can drive the rotating tool itself about a second axis of rotation (X), and a release device operable to oppose the action of said mechanical locking device remotely, to release said rotating tool from the shaft (10) of the electric motor (2); said release device being controlled by a source (4) of air under pressure.

6. An electric chuck according to claim 2, further comprising a chuck (3) for receiving a rotating tool; said chuck (3) having a mechanical locking device for fixing said rotating tool securely with respect of the shaft (10) of said electric motor (2) in such a way that the electric motor (2) can drive the rotating tool itself about a second axis of rotation (X), and a release device operable to oppose the action of said mechanical locking device remotely, to release said rotating tool from the shaft (10) of the electric motor (2); said release device being controlled by a source (4) of air under pressure.

7. An electric chuck according to claim 6, wherein said blower outlet (16) is connected to said source (4) of air under pressure which controls the release device of the chuck (3).

8. An electric chuck according to claim 1, wherein said blower outlet (16) is constituted by a calibrated nozzle (16).

9. An electric chuck according to claim 1, wherein said casing (7) is provided with at least one outlet opening (19) through which air blown over the said annular heat sink (15) can escape.

10. An electric chuck according to claim 1, wherein said annular heat sink (15) comprises a hub (17) fitted to the shaft (10) and at least one annular fin (18) extending from a peripheral surface of the hub (17); said annular fin (18) being coaxial with said first axis of rotation (A).

11. An electric chuck comprises an electric motor provided with a stator, a rotor mounted rotatably within the stator about a first axis of rotation (A), and an outer casing housing within its interior said stator and said rotor; cooling means housed within the interior of said casing for cooling the rotor; and a chuck for receiving a rotating tool, said chuck having a mechanical locking device for fixing said rotating tool securely with respect of said rotor for rotating the rotating tool itself about a second axis of rotation (X), and a release device operable to oppose the action of said mechanical locking device to release said rotating tool from said rotor, said release device being controlled by a source of air under pressure; wherein said cooling means are connected to said source of air under pressure.

12. An electric chuck according to claim 11, wherein said rotor comprises a shaft extended coaxially of said first axis of rotation (A) and mounted for rotation about said first axis of rotation (A), and a rotor armature fitted to said shaft in such a way as to face said stator; said cooling means comprising at least one annular heat sink fitted to said shaft in such a way so as to be adjacent said rotor armature, and a blower outlet connected to said source of air under pressure for directing a stream of air onto said annular heat sink in order to dissipate heat produced.

13. An electric chuck according to claim 12, wherein said annular heat sink comprises a hub fitted to the shaft and at least one annular fin extending from a peripheral surface of the hub; said annular fin being coaxial with said first axis of rotation (A).

14. An electric chuck according to claim 13, wherein said annular heat sink includes a plurality of said annular fins extending from the peripheral surface of the hub parallel to and facing one another.

15. An electric chuck according to claim 14, wherein said blower outlet is constituted by a calibrated nozzle projecting from the casing above said at least one annular fin.

16. An electric chuck according to claim 14, wherein said casing is provided with at least one outlet opening through which air blown over said annular heat sink can escape.

17. An electric chuck according to claim 13, wherein said blower outlet is constituted by a calibrated nozzle projecting from the casing above said at least one annular fin.

18. An electric chuck according to claim 13, wherein said casing is provided with at least one outlet opening through which air blown over said annular heat sink can escape.

19. An electric chuck according to claim 12, wherein said casing is provided with at least one outlet opening through which air blown over said annular heat sink can escape.

20. An electric chuck according to claim 11, wherein said casing is provided with at least one outlet opening through which air blown over said annular heat sink can escape.

* * * * *